D. S. SLATER.
Cultivator.

No. 75,211. Patented March 3, 1868.

Witnesses:
P. T. Dodge
Jno. Johnson

Inventor.
D. S. Slater
by Dodge & Munn
Attorneys

United States Patent Office.

DAVID S. SLATER, OF POYNETT, WISCONSIN.

Letters Patent No. 75,211, dated March 3, 1868.

IMPROVEMENT IN CULTIVATORS.

*The Schedule referred to in these Letters Patent and making part of the same.*

TO ALL WHOM IT MAY CONCERN:

Be it known that I, DAVID S. SLATER, of Poynett, in the county of Columbia, and State of Wisconsin, have invented certain new and useful Improvements in Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in constructing a cultivator that can be adjusted in a variety of ways, so as to adapt it to a variety of conditions, as hereinafter explained.

Figure 3:
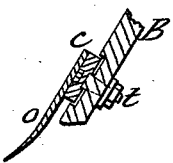
Figure 4:

Figures 3 and 4 views of portions shown in section.

Figure 1:
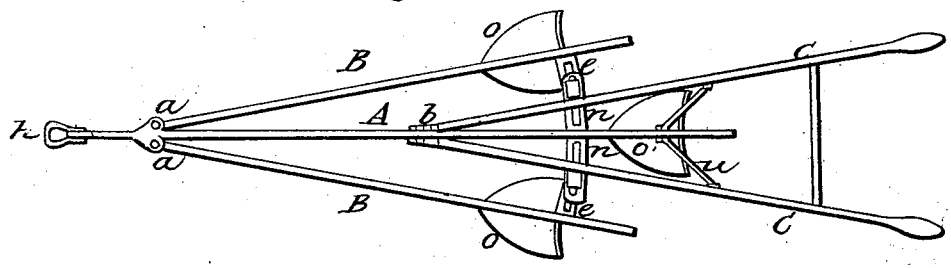
Figure 1 is a top plan view.
Figure 2:
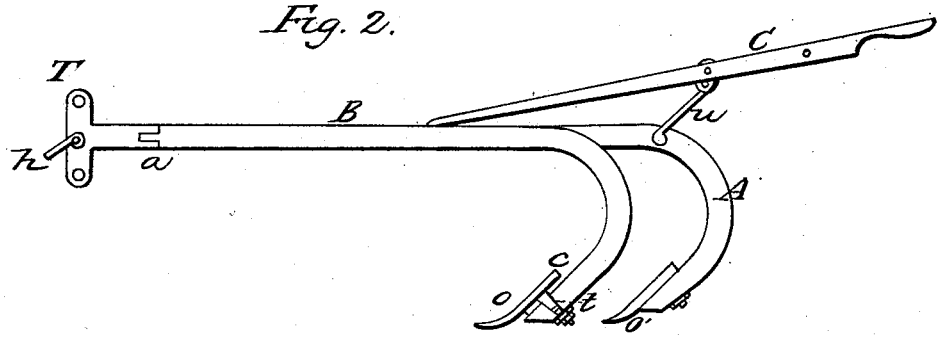
Figure 2 is a side elevation.

In constructing my cultivator, I make a central bar, A, of suitable length, curved at its rear end, as shown in fig. 2. I then construct two side-bars, B, shorter than A, and hinge them near the front, on opposite sides of the central bar A, at a, as shown clearly in fig. 2; these side-bars being also curved at their rear end, like A, but not extending so far back. Near the rear portion of the side-bars B, a slotted bar, e, projects laterally on the inside of each, where they meet and pass under similar projecting bars, n, extending outward from each side of the central bar A; these slotted cross-bars e and n being provided with a bolt and nut, by which they may be held securely in place, and at the same time, when loosened, permit of adjusting the side-bars B laterally, as may be desired, to suit rows of different widths. A pair of handles, C, are pivoted to the central bar A, near its centre, and, projecting backward to a suitable distance, are supported on two braces, u, having their lower ends bolted to the bar A, and having their upper ends pierced with a series of holes, as shown in fig. 2, to permit of adjusting the handles vertically, to suit the height of the operator. At its front end, the bar A is provided with a vertical cross-bar, T, having a series of holes in it, by which means the clevis h may be raised or lowered, as desired. To the central bar A, a shovel or cultivator-tooth, o', is bolted rigidly, while on each of the side-bars B a similar share is secured in such a manner that it can be adjusted or turned, so as to throw the earth inward, away from the plants, when young or small, and outward or towards them when larger. To effect this object, I secure to the rear face of the shares o a block or metal piece, as shown in figs. 3 and 4, this block being rounded on its rear side, and there being a corresponding cavity formed in the front side of the lower end of the standards B, into which the block c fits, as shown in figs. 3 and 4, and in which it turns freely, thus forming a joint by which the shares o can be set at any desired angle, as described. A stirrup or loop, t, passes through an opening formed between the block c and the share o, and extending back on each side of the standard B, where it is secured by a small cross-bar and nuts, thus holding the shares o fast to the standards B. By loosening the nuts, the shares can be turned at any desired angle, when they are fastened by screwing up the nuts.

By this method of construction, I produce a cultivator that is capable of adjustment in every desired manner, whereby it is adapted to the cultivation of nearly all kinds of crops, and convenient for use by either men or boys.

I am aware that cultivators have heretofore been made embracing some one or more of these features separately, and therefore I do not claim them in and of themselves; but What I do claim, is—

A cultivator consisting of the central bar A, having the adjustable handles C and the rigid share o' attached thereto, in combination with the laterally-adjustable side-bars B, having the adjustable shares o secured thereto, and all arranged to operate substantially as shown and described.

DAVID S. SLATER.

Witnesses:
W. C. DODGE,
H. B. MUNN.